United States Patent [19]
de Oliveira et al.

[11] Patent Number: 6,164,379
[45] Date of Patent: Dec. 26, 2000

[54] PROCESS FOR THE ENHANCED RECOVERY OF PETROLEUM OIL

[75] Inventors: Marcia Cristina Khalil de Oliveira; Carlos Nagib Khalil, both of Rio de Janeiro, Brazil

[73] Assignee: Petroleo Brasileiro S.A.-Petrobras, Rio de Janeiro, Brazil

[21] Appl. No.: 09/264,238

[22] Filed: Mar. 8, 1999

[30] Foreign Application Priority Data

Mar. 27, 1998 [BR] Brazil ..................................... 9801201

[51] Int. Cl.⁷ .................................................. E21B 43/22
[52] U.S. Cl. .................................... 166/275; 166/305.1
[58] Field of Search .................................. 166/305.1, 307, 166/310, 369, 250.05, 270, 275

[56] References Cited

U.S. PATENT DOCUMENTS

| | | |
|---|---|---|
| 4,110,228 | 8/1978 | Tyler et al. . |
| 4,247,371 | 1/1981 | Roller .......................................... 203/7 |
| 4,723,603 | 2/1988 | Plummer . |
| 5,302,297 | 4/1994 | Barthrope ............................. 423/158 X |
| 5,755,972 | 5/1998 | Hann et al. ......................... 166/279 X |
| 5,840,658 | 11/1998 | Rosario et al. . |

Primary Examiner—Frank S. Tsay
Attorney, Agent, or Firm—Sughrue, Mion, Zinn, Macpeak & Seas, PLLC

[57] ABSTRACT

A process for the enhanced recovery of oil with the injection of treated water is described, the process comprising the previous and controlled precipitation of the precursor chemical species present in the injection water or sea water and formation or produced water, followed by the withdrawal of such species by filtration. The resulting treated water shows low amounts of precursor ions and is perfectly suited for use as injection water in secondary oil recovery processes. In view of the fact that the process uses huge amounts of produced water, it is of deep environmental interest since it avoids discarding into the marine environment the produced water which is high in brine content. The equipment used are simple and of low cost.

7 Claims, 3 Drawing Sheets

PROCESS FOR THE ENHANCED RECOVERY OF PETROLEUM OIL

FIELD OF THE INVENTION

The present invention relates to a process for the enhanced recovery of petroleum oil with injection of water, specially a process where the elements which act as precipitation precursors for the water to be injected in an oil well are precipitated in a previous and controlled manner, the resulting water being compatible with the producing formation, the salt content of the resulting water being appropriated for injection. At the same time, the volume amount of the resulting water is adequated for keeping oil production.

BACKGROUND INFORMATION

Enhanced recovery of petroleum oil with water injection is a well-known technique to keep pressure at levels such that oil production is increased. In order to apply such method in oil fields injection water is generally sea water, taken in the vicinity of the platform and treated by de-aeration and filtration. Upon contact of the formation water which naturally exists below the oil zone with injection water, chemical reactions result which ultimately yield deposits of precipitated salts. In view of the fact that the formation water is rich in alkaline-earth metals such as $Ba^{++}$, $Sr^{++}$ and $Ca^{++}$ and the sea water used as injection water contains sulfate ions, formation and deposition of insoluble compounds such as barium sulfate ($BaSO_4$) and strontium sulfate ($SrSO_4$) is mandatory, calcium sulfate ($CaSO_4$) being less frequent. As a result from the thermodynamic imbalance of the carbon dioxide/bicarbonate system ($CO_2/HCO_3^-$) calcium carbonate ($CaCO_3$) is also formed.

Scales resulting from the deposition of insoluble compounds are consistent and may cause plugs in valves, other equipment and production strings, with the consequent oil losses. Scales in heat exchange systems cause lower heat transfer rate to the cooling water, leading to overheating. Frequent cleaning lowers the useful life time of equipment and increase the production cost of petroleum oil.

Further, in view of the fact that in the fields treated with water injection the produced water is a mixture of formation water and sea water, and that such water contains residual ions of barium and strontium, the discarding of produced water into the sea presents a potential environmental hazard, since those ions may cause a chemical imbalance in the marine environment.

The mechanism of chemical deposition is to be found in the compounds entrained by water as still soluble substances such as calcium carbonate, etc. which may form over saturated solutions from which salts may precipitate so as to form scales. The precipitation is a function of the initial nucleation followed by the growing of the crystal, and may occur in the producing formation, in the well, equipment, cooling towers, heat exchangers, evaporators as well as any site of water circulation.

In the oil industry, scales are mainly found in the production string and discarding tube, which causes nearly complete plugging of the oil flow by reducing the effective internal diameter of the tube. Scales are also found in separators, where they form a powdery deposit, and in the reservoir bottom. In the marine environment, shellfish take barium for forming shells of barium sulfate instead of calcium carbonate.

Khalil C. N. et al in "Incrustações e Antiincrustantes usados na Indústria de Petróleo", ("Scales and Anti-Scaling Agents used in the Oil Industry"), 17th Brazilian Congress of Corrosion sponsored by the Brazilian Association of Corrosion, 1993, Rio de Janeiro, R J, Brazil, discuss the kinds of scales occurring in the oil production as well as the working mechanisms of the anti-scaling agents or inhibitors, besides the criteria used in the choice of the inhibitors, among which are the trend to emulsify, compatibility with other products, thermal stability and toxicity.

Preventing the deposition of scales is normally effected with the aid of products the properties of which inhibit the precipitation and/or incrustation of certain compounds which are knowingly insoluble under the conditions of activity, pressure and temperature of the reservoir. These products work in sub-stoichiometric amounts through adsorption into the growing sites of the crystals, as anti-flocculating agents, as well as delayers of the nucleation as well as of the growing and modification of the crystals habit.

U.S. Pat. No. 5,840,658 of the Applicant teaches the use of a scale inhibitor based on anionic polymers, mainly from the class of polyphosphonates and polycarboxylates, of low molecular weight, which acts in a preventive way relative to the cations which are the precipitation precursors. In the condition of production of the well, the potentially scaling water will gradually dissolve the inhibitor which is present in very low concentration, and preferably in a concentration which is close to the minimum effective concentration of the scale inhibitor under the conditions designed for the well.

In spite of the fact that the performance of the inhibitors indicates that prevention of scales may be reached in a safe, efficient, long-lasting and monitorable way, the prevention of scales as effected according to the state-of-the-art technique implies permanent costs in chemical reagents and operation activities.

U.S. Pat. No. 4,723,603 teaches a process for the prevention of plugging caused by the precipitation of insoluble salts which employs a filtration process on a reverse osmosis membrane. The membrane acts in the sense of impeding the passage of precipitate precursor ions present in an injection water to the desired injection water while at the same time allowing the passage of pure water and harmless ions through the membrane. Actually the membrane effects a de-sulfating process since the retained ions are mainly sulfates, which may precipitate when they meet barium and strontium present in the formation water. The membrane is chosen according to the size and pore as well as to the electric charge. Common commercial membranes are those polyamide membranes designed for removing sulfate ions from injection water. In order to meet the requirements of productivity in terms of amounts of injection water, commercial membranes should filter between 8.49 and 84.9 $I/m^2$-hr. Normally each unit of injection water filtered by the membrane yields one unit of brine.

Thus, it can be seen that the current methods for the scale prevention/correction in oil production equipment are usually costly either as a result from the permanent use of chemical reagents and operation activities as in the case of the polymeric inhibitors or their cost derives from the equipment itself which is to be used, as in the case of the reverse osmosis membranes, which normally comprise a module of 11 meters high, weighing more than 100 tons and which needs nearly 15 months to be built and mounted.

Therefore, the oil industry needs a secondary oil recovery process which would use the previous and controlled precipitation of the chemical species which act as precipitation precursors, mainly sulfate and barium, followed by the removal of the precipitated ions by filtration, the resulting water being compatible with the producing formation when it is employed as injection water in the enhanced oil recovery. Such high efficiency and low cost process of enhanced oil recovery with injection of treated water, which dispenses with high cost equipment and/or reagents, is described and claimed in the present application.

SUMMARY OF THE INVENTION

The process for enhanced oil recovery with injection of treated water according to the present invention comprises therefore the previous and controlled precipitation of the precursor chemical species present in a well-defined composition of sea water and produced water, followed by the removal of such precipitated species by filtration. The so treated water is useful as injection water in enhanced oil recovery operations.

Broadly, the inventive process comprises the following steps:

chemically characterizing the water produced by the producing formation and evaluating with the aid of theoretical simulation the precipitation potential of the precursor ions of sea water in contact with the formation ions, in such amount so as to cause scales in the producing formation and in the production string when those ions contact the sea water;

from data obtained via theoretical simulation, assessing the optimum mixture ratio for injecting treated water which will contain the lowest possible precipitating precursor ions so as to avoid the precipitation conditions when the treated water meets the ion-rich formation water;

from the optimum mixture ratio, preparing treated water by mixing under agitation precursor-ions-containing sea water and ion-containing formation water, precipitating at least a portion of such precursor ions;

filtrating the precipitate of precursor ions with the aid of a filter means for separating the treated water product, freed from at least a portion of the precursor ions, and useful as injection water in a secondary oil recovery process;

injecting the treated water product in the producing formation through an injection well at the flow rate of injection required by the production well;

displacing the hydrocarbons being produced with the aid of the treated injection water product towards a production well;

recovering the hydrocarbons from the formation through said production well.

Thus, the present invention provides a process for the enhanced recovery of oil with injection of treated water where the previous and controlled precipitation of the precursor chemical species present in a well-defined mixture of sea water and formation water followed by filtration may lead to an injection water of non-scaling characteristics, so as to preserve oil production equipment.

The present invention provides further a process for the enhanced oil recovery with injection of treated water where scales in the producing formation and in the production string are avoided and/or minimized by using an injection water having low contents of precursor ions.

The present invention provides further a process for the enhanced oil recovery with injection of treated water where the injected volumes are those required to keep the pressure in the reservoir and increase oil production.

The present invention provides still a process for the enhanced oil recovery with injection of treated water which eliminates the discarding of produced water, this having great advantage to the marine environment.

DETAILED DESCRIPTION

Figure 1:
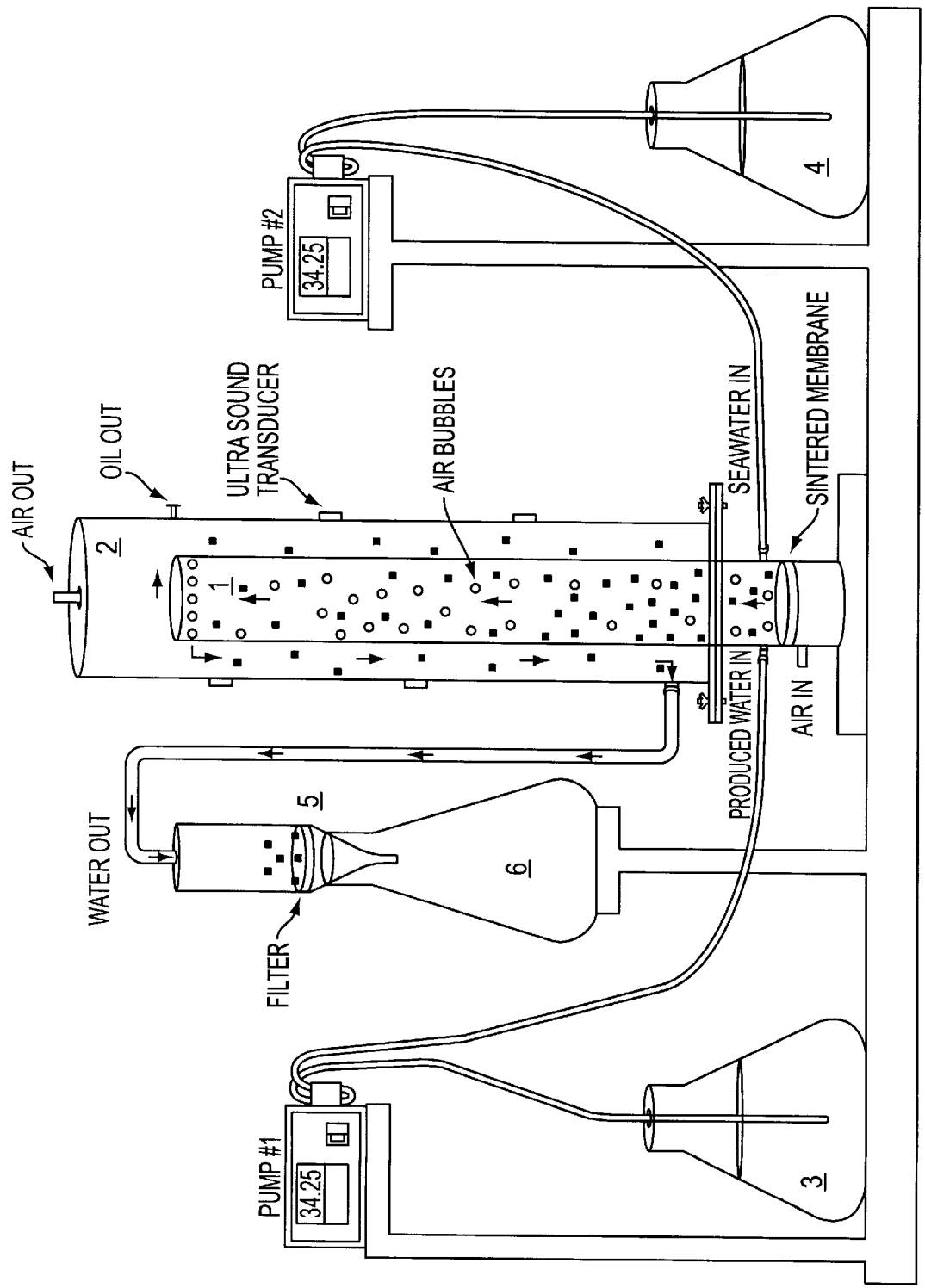
FIG. 1 illustrates, in a lab scale, the precipitating vessel used to apply the method of the present invention in an on-flow system.

In order to determine the optimum mixture ratio between the produced water and sea water so as to obtain by precipitation the appropriate injection water for the enhanced oil recovery process according to the present invention, the exact content of precursor ions present in the formation water and in the sea water should be determined.

One tool for determining the total dissolved solids is electrical conductivity. The conductivity or specific conductance is by definition the inverse of the resistance offered to the passage of alternate current by the volume of 1 cc of the electrolytic solution under consideration.

pH measurements determine if the water is acidic, alkaline or neutral. The pH adjustment is important for the control of corrosion in iron. It was found that for a pH between 4 and 10 the corrosion rate is independent of pH, being a function only of the rate at which the oxygen diffuses to the metallic surface.

Ion-exchange chromatography was employed in the tests for sulfate and chloride content of the samples of synthetic water and filtrates. The instrument was the DX 500 Chromatograph from Dionex fit with an anionic exchange column and cationic resin. The samples were analyzed according to the ASTM D4327/91 Method.

The assessment of barium, strontium, calcium, magnesium, potassium and sodium in the samples was effected by emission spectrometry in plasma, with the aid of the ARL3410 model fit with a miniflame, available from the Fisons company. Argon was used as the entraining gas at a pressure of 40 psi and flow rate of 0.8 liters/min.

The resulting precipitates were evaluated with the aid of X-ray fluorescence techniques, X-rays diffratometry and electronic microscopy.

Further, in the development of the present process for enhanced oil recovery with injection of treated water the influence of physical chemical parameters as well the precipitation potential linked to the mixing of sea water and formation water should be evaluated.

Parameters which influence the precipitation potential and the morphology of crystals, such as nucleating agents and surface agents as well as mixture ratio of the produced or formation water and sea water were evaluated.

The effected experiments lead to conditions designed to precipitate the highest possible amount of barium sulfate in the precipitation equipment, in order to obtain, after filtration, an injection water product having the lowest possible amount of precursor ions, such product being then used in the enhanced oil recovery process. The maximum precipitation should occur in the mixture interval between the injection front, that is, formation water/sea water ratio (90/10) and the ultimate advancement of sea water in the reservoir.

A thermodynamic model for predicting precipitation was used to predict the occurrence as well as the intensity of the precipitation in the mixture of the sea water and the formation water. The calculations of such model are based on equations of the equilibrium constants, the mass balances and the Pitzer formalism for calculating the activity coefficients. The occurrence of insoluble compounds and the total amount of each ion in solution for a certain temperature and pressure are then quantitatively estimated.

In order to simulate the various steps of the encounter of waters in the process of enhanced oil recovery, different mixture ratios for sea water/formation water were determined. Based on the pH value, the density and the chemical composition of the waters, as well as temperature and pressure, the model calculates the ionic strength and the pH of the mixture of waters. From these latter parameters the equilibrium constants, the activity coefficients of the salts besides the mass of solids which were precipitated at each mixture ratio may be inferred.

According to the predictive model used in the present application, under the specific thermodynamic conditions of the waters, the mass of insoluble compound will be equivalent to the amount exceeding its solubility product (Kps). On the other hand, it is well known that the precipitating systems may exist under supersaturation conditions, under which the product of the activities of the precipitating ions is higher than the Kps value.

The predictive model for precipitation allows that the masses of $BaSO_4$ and $SrSO_4$ to be formed during the process of water injection be calculated. For two oil fields of the Campos Basin, Rio de Janeiro, Brazil, Field 1 and Field 2, Rio de Janeiro, TABLE 1 below lists how this precipitation may occur for varying amounts of formation water/sea water (FW/SW) ratios. In order to estimate the precipitation potential, two limiting conditions, related to the reservoir and the surface, are considered.

(SI) of the precipitating salt. The SI is a very significant parameter for evaluating the scaling or encrustation potential, since it evaluates the trend in forming the precipitate and varies with different FW/SW mixture ratios.

The Saturation Index of a solution and its corresponding crystal, at a certain temperature and pressure, is mathematically defined as the value of the logarithm of the state of saturation, which in turn is the product of the ionic activities, divided by the thermodynamic solubility product of the crystal (Kps). For example, for barium sulfate, $$IS = \log\frac{a_{Ba}a_{SO4}}{Kps} = \log\frac{m_{Ba}m_{SO4}f_{Ba}f_{SO4}}{Kps} = \log\frac{Kps^*}{Kps}$$

wherein $a_i$, $m_i$ and $f_i$ are respectively ionic activity, concentration as molality and activity coefficient of the i species, in this case $Ba^{++}$ and $SO_4^{2-}$, KPs is the solubility product of barium sulfate which is worth $1.1024.10^{-10}$, while the Kps of strontium sulfate reaches $2.4464.10^{-7}$ and Kps* is the solubility product corrected by the activity coefficient.

The activity coefficients are obtained from the thermodynamic model for precipitation.

For Fields 1 and 2 which have been studied, the SI of barium sulfate is between 2.5 and 3.3, respectively if measured on the surface, and around 1.8 and 2.6 respectively if measured in the reservoir. On the other hand, the Si for strontium sulfate for the same fields is around 0.18 and 0.44 if measured on the surface and 0.17 and 0.42 if measured in the reservoir. The surface conditions are T=25° C. and P=1 bar while the reservoir conditions are T=70° C. and P=200 bar.

Physically, SI=1 means that the solution and the corresponding solid phase are balanced, a condition which normally does not lead to the formation of scales. SI<1 means an unsaturated solution and SI>1 means a supersaturated solution. The maximum supersaturation index of the mixture

TABLE 1

| FW/SW | FIELD 1 | | | | FIELD 2 | | | |
| | Surface | | Reservoir | | Surface | | Reservoir | |
| Ratio | $BaSO_4$ | $SrSO_4$ | $BaSO_4$ | $SrSO_4$ | $BaSO_4$ | $SrSO_4$ | $BaSO_4$ | $SrSO_4$ |
| --- | --- | --- | --- | --- | --- | --- | --- | --- |
| 90/10 | 67 | Φ | 64 | Φ | 512 | Φ | 499 | Φ |
| 80/20 | 60 | Φ | 59 | Φ | 458 | Φ | 456 | Φ |
| 70/30 | 53 | 7 | 52 | Φ | 401 | 157 | 399 | 106 |
| 60/40 | 46 | 37 | 45 | 11 | 344 | 229 | 343 | 186 |
| 50/50 | 38 | 42 | 38 | 19 | 287 | 232 | 286 | 198 |
| 40/60 | 31 | 33 | 30 | 13 | 229 | 199 | 229 | 171 |
| 30/70 | 24 | 15 | 23 | Φ | 172 | 147 | 171 | 124 |
| 20/80 | 16 | Φ | 16 | Φ | 115 | 83 | 114 | 64 |
| 10/90 | 9 | Φ | 9 | Φ | 57 | 12 | 56 | Φ |

Φ — Below the saturation level

TABLE 1 above shows that for each formation water/sea water mixture ratio there is a different content of mass of precipitate. For the mixture ratio corresponding to the injection front (90/10), the mass of $BaSO_4$ is larger and is gradually reduced from that ratio on. On the other hand, the precipitation of strontium sulfate starts at the 80/20 ratio only, with a maximum at the 50/50 ratio.

Due to the chemical composition of its waters (see Table 2 below), Field 2 shows a precipitation potential 7 times higher than that of Field 1, so that the amount of produced salts is more critical in the case of Field 2.

Another important parameter to be considered in the development of the present process is the Saturation Index of waters corresponds to the point where the precipitation should occur more severely in the field.

Values of SI obtained for $SrSO_4$, SI<1.0, mean that in such system the presence of $SrSO_{4(s)}$ is probably due to a co-precipitation process.

Collected data indicate surface SI higher than reservoir SI, caused by the influence of temperature and pressure. This demonstrates a growing trend to the formation of scales from the production string and up to equipment and valves.

When salty waters are being precipitated, several variables should be considered. Thus, ionic force, salinity, activity coefficient and formation of ionic pairs should be considered in the process of evaluating the behavior of ions in solution.

For both Fields considered under the process of the present invention, ionic strength is lowered with the increase in the amount of sea water in the sea water/formation water mixture.

As for the salinity of the mixture, it is also reduced with the increase in the amount of sea water, since the formation water has salinity (as NaCl content) and ionic strength higher than those of sea water.

Another important parameter is, for each mixture ratio, how varies the concentration of ions involved in the precipitation process. It was found that the 90/10 ratio is the ratio which best suits the stoichiometric ratio between barium and sulfate (2.29 meq and 3.0 meq, the ratio being 0.76), such ratio being then favorable to the precipitation process.

In the precipitation process one should further consider the influence of nucleating agents, these being compounds which somehow aid in the precipitation process. One of such agents is smectite which electrophoretic mobility is −3.12 $\mu$m.cm./V.s. In the development of the present invention the possibility of using clay minerals as nucleating agents in the precipitation process in the mixture formation water/sea water was considered. Lithium-exchanged smectite (sodium clay) revealed itself a satisfactory nucleating agent. The nucleating agent acts in terms of reducing the activation energy for the growing step of the crystal which is in the process of precipitation.

In the process herein described and claimed for precipitating salts from waters in order to obtain injection water to be used in the enhanced oil recovery, the waters under mixture are agitated with the aid of ultrasound waves in the reaction medium. The displacement of ultrasound waves in the reaction medium results in quick movements of the fluid caused by compression and rarefaction, with the phenomenon of cavitation causing the formation, growth and raising of millions of microscopic bubbles. As a consequence of the application of ultrasound, ions as well as extreme and localized temperatures and pressures are generated, which normally make easier and increase the contact between reagents and therefore the chemical reactions. In the process of agitation by ultra sound waves the sound waves from the transducer irradiate through the solution in the reaction vessel, which cause an alternation of high and low pressure in the solution. In the low pressure stage the millions of bubbles grow, while in the high pressure stage there is the collapse or implosion of bubbles with the release of large amounts of energy.

PREFERRED MODE

As referred to above, the preferred mode of the enhanced oil recovery process with injection of treated water according to the present invention comprises the previous and controlled precipitation of the precursor chemical species present in a well-defined mixture of sea water and produced water, followed by the removal of the precipitated species by filtration. The so-treated water is suitable for use as injection water in enhanced oil recovery operations.

The preferred mode of the invention contemplates thus the steps of chemical characterization of the produced water as well as the evaluation of the precipitation potential through the theoretical simulation of the several steps of the encounter of sea water and formation water, so as to establish the optimum mixture ratio for injection of treated water at the lowest possible content of precursor ions.

In field applications, the treated water will be injected according to the flow rate required by the production well. This means that the flow or flow rate of treated water to be injected is the one required for, together with the volume of formation water, attaining, in the formation, a pressure which will increase the oil production to the desired levels.

In the lab scale, the previous and controlled precipitation of the precursor species according to the invention is obtained by using an on-flow system.

The on-flow system is carried out with the aid of a precipitating vessel. According to FIG. 1 attached, the precipitating vessel is made up of an inner cylinder 1 and an outer cylinder 2, both built from a transparent plastic like acrylics or any similar material, where the mixture of fluxes of sea water and produced water will be effected. The bottom of the inner cylinder 1 is provided with a sintered membrane through which pressurized air is introduced in order to aid in the agitation or flotation of the waters under mixture. The upper end of cylinder 1 is open. The upper end of cylinder 2 is provided with an opening through which air may escape. Further, at $\frac{2}{3}$ of its height, cylinder 2 is laterally provided with an opening designed to withdraw oil separated from the formation water. Ultrasound transducers are adapted to the outer portion of cylinder 2 so as to aid in the mixture of waters and salt precipitation. Produced water kept in vessel 3 is pumped to the interior of cylinder 1 where it meets sea water pumped from vessel 4 to the interior of said cylinder 1. As a result of the mixture of sea water and produced water, a precipitate of barium sulfate $BaSO_4$ and strontium sulfate $SrSO_4$ is immediately formed. The treated water product to be used as injection water results from the filtration of the precipitate on any filter aid, for example a sintered filter 5. The resulting treated water is kept in a vessel 6 and is ready for use. The resulting treated water thus shows low contents of precipitation precursors and is specially suitable for use as injection water in enhanced oil recovery processes.

In order to avoid precipitate adherence to the walls of the vessel where the waters are mixed, a surface agent such as sodium dodecyl sulfate (SDS) is added to the sea water.

A nucleating agent such as lithic clay may also be added in order to increase the precipitation rate.

The Example below is designed to illustrate the invention and should not be construed as limiting it.

EXAMPLE

In order to provide a truly representative test of the viability of the inventive process, a complete sequence of the overall steps required to obtain the treated water to be used as injection water in an enhanced oil recovery process was run. To this end, the sea water and formation water of two oil fields of the Campos Basin (Rio de Janeiro, Brazil) were tested, then the precipitation potential of the several mixture ratios between sea water and formation water was assessed.

The chemical composition of such waters is listed in TABLE 2 below.

TABLE 2

Figure 2:
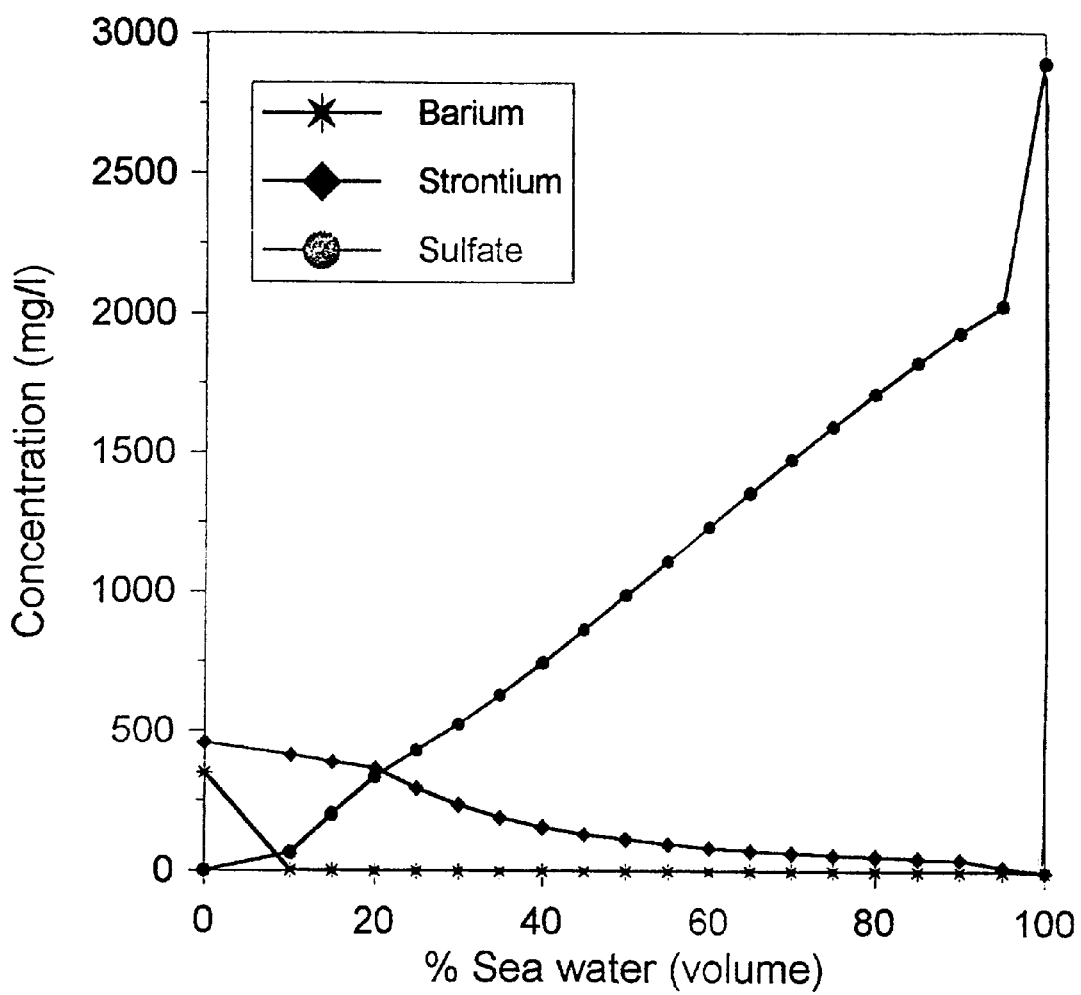
FIG. 2 is a plot of the chemical composition of the treated water as a function of the volume percent of sea water and the concentration of barium, strontium and sulfate ions.

| Chemical Composition (mg/l) | Sea Water | Formation Water FIELD 1 | Formation Water FIELD 2 |
|---|---|---|---|
| Barium | 1 | 46 | 350 |
| Calcium | 371 | 818 | 1585 |
| Strontium | 6 | 198 | 459 |
| Magnesium | 1466 | 325 | 405 |
| Potassium | 404 | 102 | 356 |
| Sodium | 11382 | 20000 | 28410 |
| Bicarbonate | 118 | 390 | — |
| Bromide | 61 | 75 | 110 |
| Chloride | 21575 | 33700 | 47756 |
| Sulfate | 2895 | 5 | 5 |
| Density (g/cm$^3$ at 20° C.) | 1,027 | 1,037 | 1,045 |
| pH | 8,17 | 7,58 | 7,59 |
| Salinity | 35573 | 55564 | 78,740 |
| Electrical Conductivity (μmho/cm) | 32,203 | 40,768 | 52,979 | mixture ratio between the waters, as may be observed in FIG. 2 attached. According to FIG. 2 and TABLE 3, for the 50/50 ratio the contents of barium and strontium are sufficiently low while the sulfate content is still too high for injecting the resulting water.

It was further found that in the presence of SDS surface agent there is a lower mass of precipitate adhered to the walls of the precipitating vessel and that the presence of nucleating agents favors the precipitation process.

TABLE 3 below lists the contents of the elements Ba, Ca, Sr and S in the resulting precipitates (under FRX) as well as the contents in Ba and Sr sulfates (under DRX) and the contents of $Ba^{++}$, $Sr^{++}$ and $SO_4^-$ solubilized in the treated water (filtrate).

TABLE 3

| FW/SW Ratio | Agitation | Precipitates FRX Ba | Ca | Sr | S | DRX | Filtrate Plasma Ba | Sr | SO$_4$ |
|---|---|---|---|---|---|---|---|---|---|
| 50/50 | Flotation | 52 | 0.85 | 4.3 | 7.5 | Ba,Sr(SO$_4$) | 2.9 | 168 | 840 |
|  | Ultrasound |  |  |  |  |  | 2.7 | 165 | 970 |
|  |  |  |  |  |  |  | 2.4 | 152 | 1160 |
| 50/50 silica | Flotation | 52 | 0.94 | 4.8 | 7.8 | Ba,Sr(SO$_4$) | 2.8 | 149 | 660 |
|  | Ultrasound |  |  |  |  | SiO$_2$ | 2.5 | 170 | 720 |
|  |  |  |  |  |  |  | 3.6 | 186 | 786 |
| 50/50 | Flotation | 56 | 1.6 | 8.8 | 7.9 | Ba,Sr(SO$_4$) | 1.3 | 180 | 880 |
| 70/30 | Ultrasound |  |  |  |  | CaCO$_3$ | 1.2 | 200 | 540 |
| 30/70 | 2 Transd |  |  |  |  |  | 1.3 | 160 | 1100 |
| 70/30 | Flotation | 45 | 0.4 | 9.7 | 6.3 | Ba,Sr(SO$_4$) | 7.3 | 280 | 190 |
|  | Ultrasound |  |  |  |  |  | 4.6 | 300 | 210 |
|  | 2 Transd |  |  |  |  |  | 1.1 | 220 | 750 |
| 50/50 | Flotation | 76 | 0.9 | 16 | 12 | Ba,Sr(SO$_4$) | 1.3 | 170 | 925 |
|  | Ultrasound |  |  |  |  |  | 0.8 | 160 | 980 |
|  | 2 Transd |  |  |  |  |  | 1.4 | 200 | 710 |
| 50/50 Barite | Flotation | 49 | 0.5 | 10 | 7.0 | Ba,Sr(SO$_4$) | 1.5 | 240 | 385 |
|  | Ultrasound |  |  |  |  |  | 0.82 | 200 | 1100 |
|  | 4 transd |  |  |  |  |  | 0.8 | 250 | 710 |
| 90/10 Barite | Flotation | 52 | — | 5.1 | 7.0 | Ba,Sr(SO$_4$) | 1.5 | 334 | 37 |
|  | Ultrasound |  |  |  |  |  | 2.7 | 337 | 220 |
|  | 4 transd |  |  |  |  |  | 2.5 | 275 | 540 |
| 50/50 | Flotation | 50 | 0.7 | 9.5 | 14 | Ba,Sr(SO$_4$) | 0.95 | 154 | 1100 |
|  | Ultrasound |  |  |  |  |  | 0.88 | 170 | 1100 |
|  |  |  |  |  |  |  | 1.00 | 170 | 1100 | wherein
FRX means X-ray fluorescence analysis which quantitatively determines the chemical elements present in a solid sample.
DRX is the X-ray diffratometry analysis used in the identification of the solid samples according to their crystallographic structure.
Plasma is an analytical tool used to determine ions in solution.

Several on-flow tests were run in the precipitating vessel illustrated in FIG. 1. For these tests, data were obtained by varying the mixture ratio between the formation water (produced water) and sea water, as well as the presence of nucleating agents and a surface agent, sodium dodecyl sulfate (SDS) and the intensity of the ultra sound. TABLE 3 below illustrates the experimental data.

SDS is a surface agent designed to modify the wettability of the crystal.

It was found that the precipitation of barium is complete and that the content of residual sulfate is related to the According to the test to be effected in the precipitating vessel of FIG. 1, sea water and produced water are simultaneously mixed, with the aid of pumps, in the upward direction, under flotation of induced air, this promoting the mixture of the waters besides providing for the separation of water and oil. Air is distributed through a sintered membrane. After precipitation, the resulting mixture is filtered through a Millipore membrane so as to yield the effluent called "treated water since it contains low amounts of precipitation precursors.

Placed outwards the precipitating vessel, the transducers aid in promoting size and morphology of crystals. The continuous flow of the suspension of precipitated solids in the mixture of water is perpendicular to the field of ultrasound waves.

The present process contemplates further the simultaneous removal of oil since the produced water on leaving the water-oil separator contains a residual oil content which should be removed in order to allow that water be re-injected. Tests indicate that the flotation procedure according to the invention leads to the removal of more than 50% of the mass of residual oil, so as to fit the water for re-injection. Thus, in the presented Example, the samples which contained around 55 ppm in oil and grease after separation of oil in the separator, after flotation in the separating vessel only show around 20 ppm in oil and grease.

Data from TABLE 3 indicate that the mixture of produced water and sea water yield intense precipitation and that the filtered water shows low contents of precursor ions, especially for the FW/SW 90/10 mixture ratio. The presence of nucleating agents and surface agents as well as the agitation improve the precipitation process, by increasing reaction rate and crystal morphology. However, the mixture of waters by itself meets the requirements of a suitable injection water.

Besides, experimental data set forth in TABLE 3 demonstrate the feasibility of using the produced water by mixing it with sea water, precipitation and filtration and finally injection of the treated water product.

The described method is simple and may be implemented in maritime installations, of low cost, and highly favorable to the environment since the huge amounts of produced water which are consumed are no longer discarded in the marine environment, with the consequent preservation.

The present process may be used in the scale prevention in other equipment used in off-shore installations, such as boilers. Whenever sea water is available and in the presence of formation water the present process may be applied in order to obtain a good quality industrial water, the use of which will preserve industrial equipment from undesirable scales.

VIABILITY OF THE PROPOSED PROCESS IN OIL FIELDS

Aiming at testing the precipitation potential of the treated water product according to the present invention in the vicinity of producing wells of the Campos Basin, Rio de Janeiro, Brazil, a predictive study of the behavior of such product was effected.

The predictive study of the potential of water precipitation was directed to a production scenario of up to seven years. In this study, the technological innovation was considered as the injection of treated water obtained from the controlled precipitation of the insoluble sulfates resulting from the previous mixture of produced water and sea water as well as the comparison with the injection of sea water of the state-of-the-art technique.

The method involves the assessment of the chemical composition of the produced waters.

The waters produced in the chosen Field (which is Field 2 in TABLE 1) were collected at the well heads of the producing wells and separated from the respective oil. The chemical composition of such waters was assessed in the laboratory. The waters were characterized with the aid of ICP and ionic chromatography.

Prediction of Precipitation

From the chemical analyses for the assessment of the chemical composition of the waters produced in Field 2 the precipitation of barium sulfate and strontium sulfate was simulated, for the several mixture ratios between the original formation water and sea water, at field conditions of a temperature of 25° C. and a pressure of 1 bar. For each mixture ratio between formation water and sea water (FW/SW) the total mass of precipitate and salinity was determined.

Composition of the treated water

After selection of the rich-barium wells, and in order to provide for the demand of at least one injection well in the field, a theoretical flow rate of water injection of 1,000 m$^3$ a day was set forth.

The average composition of the water produced (PW) by the selected wells was assessed by estimating the weight average of the water composition of each well related to the overall flow rate of water injection.

From a series of experiments with the produced water and the sea water, by simulating the mixture of the waters, the optimum mixture ratio for produced water and sea water was selected as 90/10, that is, the ratio where the amount of precipitation precursors, chiefly barium and sulfate, would be present in the minimum concentrations as would be acceptable for the scale control. After filtration, the resulting water, at the previously set forth ratio, was called "treated water".

It should be noted that a higher precipitation potential favors the process of previous precipitation, since the precipitation of barium sulfate may be maximized.

It was hypothesized that, in view of the actual salinity figures of the produced waters, the treated water, when injected, may find in the reservoir a mixture of the formation water and the sea water or just sea water. That is why it was chosen to simulate the mixture of treated water with the mixture of produced water and sea water at the 50/50 ratio.

The simulation of the injection water meeting the mixture of formation water and sea water was due to the reservoir having been submitted to the injection of sea water for a long period.

Prediction of the precipitation potential in the producing wells

This requires a comparison among injection of sea water, treated water and de-sulfated water (chemical composition of sea water to which were added 100 mg/l sulfate).

Figure 3:
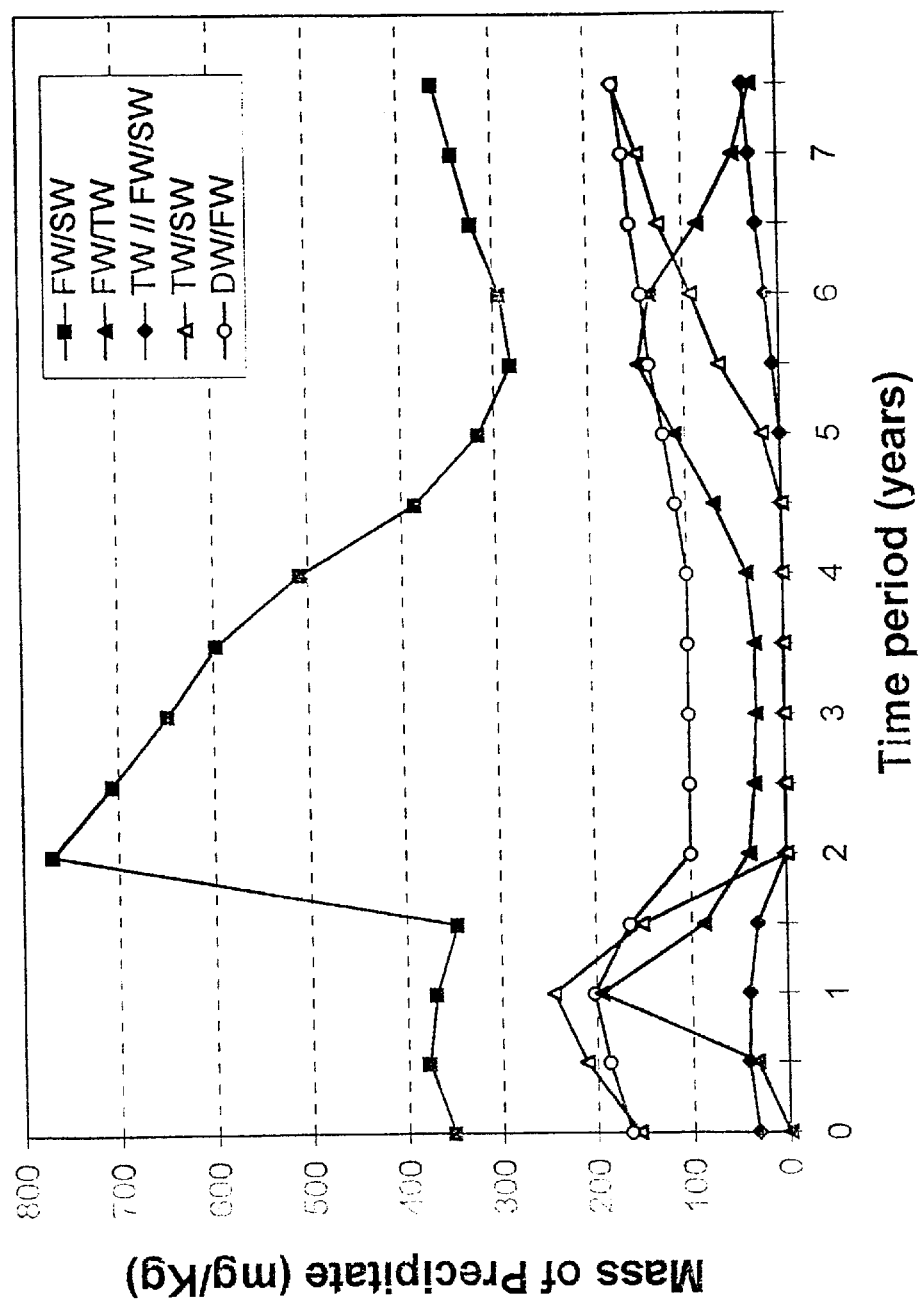
FIG. 3 is a plot which illustrates the precipitation potential with treated water as compared to the same potential when sea water is employed.

On the other hand, according to FIG. 3 attached, the percentage of the injection water in the predicted salinity was assessed by numerical simulation of the behavior of the flow of injection water before the formation water, during a seven-year period beginning in January 1997 and up to 2004, for a producing well of the Field 2 of the Campos Basin, Rio de Janeiro, Brazil. This allowed the prediction of the mass of precipitate during said period of time and comparison of it with the mass of precipitate formed by using treated water as injection water.

As indicated in FIG. 3 the injection of treated water significantly lowers the precipitation potential, as compared with the injection of sea water and also with the injection of de-sulfated water, a commercial, state-of-the-art method described in U.S. Pat. No. 4,723,603. The method described in said document, as stated hereinbefore, utilizes a membrane, which through the reverse osmosis process reduces the sulfate content of sea water.

According to the present method, the mixture of treated water and sea water, with the formation water and/or with the mixture of such waters, provides a minimum amount of precipitate. Hypothesizing that it is more probable that injection or treated water (TW) meets the mixture of formation water and sea water (TW//FW/SW), the precipitation potential in this case closely approaches TW/SW. A similar behavior is observed in these cases.

The precipitation prediction in the producing wells of the Campos Basin was carried out by comparing the precipitation potential from injection of sea water (SW) and injection of treated water (TW) into a producing well. As may be observed, the precipitation maximum with injection of TW reaches less than 10% of the precipitation potential observed when SW is injected.

Conclusion

The treated water product resulting from the precipitation process when formation water and sea water are mixed complies with the required specifications for a water to be injected in a reservoir, as set forth in the data in TABLE 4 below. Besides, the injection of treated water presents a lower precipitation potential as compared with the injection of sea water and the injection of de-sulfated water (commercial, state-of-the-art method of U.S. Pat. No. 4,723, 603).

It should be emphasized that although the study herein described is specifically applied to Field 2 of the Campos Basin, Rio de Janeiro, Brazil, the same principles may be applied to those fields where the secondary oil recovery occurs by injection of sea water. Further, in a few cases it would be possible to select among the producing wells the alkaline-earth metal-rich water and the sulfate-rich waters, to as to comply with the demand of the precipitation process.

TABLE 4

| | |
|---|---|
| Oil and grease residual content | 20 to ppm |
| Suspended solids | Diameter: less or equal to 10 $\mu$m |
| | Concentration: lower than 40 ppm |
| Sulfate content | lower than or equal to 120 ppm |
| Salinity | higher or equal to 35000 ppm |
| pH | around 7.0 |

As may be inferred from TABLE 4, the salinity of the treated water is near that of the water of the producing formation and the sulfate content is similar to that of de-sulfated water.

CONTROL EXAMPLE

A comparison was effected between the characteristics of the treated water product of the invention regarding the salinity, sulfate content and cost related to two state-of-the-art methods, that is, sea water used as injection water and de-sulfated water, obtained for example with the aid of the equipment of U.S. Pat. No. 4,723,603. Data are listed in TABLE 5 below.

TABLE 5

| Injection water | Salinity (ppm) | Sulfate (ppm) | Relative cost |
|---|---|---|---|
| Formation water | 98,000 | 5 | — |
| Sea water (Original) | 35,500 | 2,950 | 1 |
| Treated water by previous precipitation according to the invention | 77,700 | 120 | 2 |
| De-sulfated water (U.S. Pat. No. 4723603) | 32,500 | 100 | 20 |

From TABLE 5 above it is found that for a similar sulfate content, the present invention provides for a method the relative cost of which is much lower than that for example of U.S. Pat. No. 4,723,603. It should be noted that the higher salinity of the treated water product according to the present invention does not increase the precipitation potential.

A further positive aspect is the high salinity content of the treated water to be used in the secondary oil recovery process according to the present invention, said salinity being beneficial to the process since it avoids the swelling of clays within the reservoir.

The injection of treated water involves a minimum investment cost, when considering the possibility of adapting the original installation of sea water injection. Maintenance costs are based on the periodical exchange of filter aids, which represents a rather low expenditure. The same is not true when the technique to be adopted is that of the membranes according to U.S. Pat. No. 4,723,603, which involves high installation, maintenance and operation costs.

Therefore, among the alternatives for water injection, the injection of treated water (TW), resulting from the previous precipitation process of the precipitation precursors according to the present invention, is proved as technically and economically feasible.

Thus, the advantages of the proposed process are as follows:

Low operation and investment cost;

Utilization of the produced water, avoiding an environmentally unfavorable discarding;

by flotation, simultaneous removal of the residual oil present in the produced water;

production of water of high salinity and low contents of potentially scaling elements;

high-quality injection water;

generated residuum (barite) may be used for other purposes, for example weighting agent for a drilling fluid;

dramatic reduction in the precipitation and/or scaling potential;

minimization of the development of sulfate reducing bacteria (SRB);

lower impact on the environment.

A final thought should be directed to a special care to be taken when using the process of the invention in the sense that the residuum of the precipitate should be tested by nuclear experts in order to assess its radioactive content, seen the possibility of co-precipitation of radium, which is also present in the formation water. In case of high radioactivity, said residuum should be considered as radioactive waste, and treated according to the environmental regulations applied to this matter.

Thus, the present process consists of a cleaner technology than that of the known processes, since presently wastes of various kinds are scattered around, this being hazardous to man and environment.

We claim:

1. A process for the enhanced recovery of petroleum oil with the injection of treated water, the petroleum oil having origin in an oil- and water-containing producing formation having fluid passages therein and being withdrawn from the formation through a production string, which comprises the steps of:

chemically characterizing the water produced by said formation and by theoretical simulation estimating the precipitation potential of precursor ions present in sea water when in contact with counter ions in the formation water, in such amount so as to cause scales in the formation and in said production string when in contact with the sea water;

from data provided for by the theoretical simulation, establishing the optimum mixture ratio of sea water and produced water to yield a treated water for injection having the lowest possible content of precursor ions so as to avoid precipitation conditions when treated water meets the formation water;

from the established optimum mixture ratio, preparing treated water by mixing under agitation sea water which contains precursor ions and counter-ion-containing produced water, so as to precipitate at least a portion of said precursor ions;

filtrating the resulting precipitate of precursor ions on a filter aid and separating a treated water product, useful as injection water in a process for the enhanced oil recovery;

injecting the said treated water product into the producing formation through an injection well at the injection flow rate required by the producing well;

displacing the desired hydrocarbons from the producing formation with the aid of the treated water product for injection to a production well; and recovering the hydrocarbons from the producing formation through said production well.

2. A process according to claim 1, wherein the precursor ions are anions and the counter ions present in the producing formation are cations.

3. A process according to claim 2, wherein the anions are divalent $SO_4^{--}$ anions.

4. A process according to claim 2, wherein the cations are selected from the group consisting of $Ba^{++}$, $Sr^{++}$ and mixtures of same.

5. A process according to claim 1, wherein the concentration of precursor ions in sea water is higher than 2,000 ppm.

6. A process according to claim 1, wherein the concentration of precursor ions in the treated water is lower than 120 ppm.

7. A process according to claim 1, wherein the treated water further comprises ions from any of the waters used for preparing said treated water, such ions remaining substantially soluble when in contact with the ions present in the producing formation.

* * * * *